United States Patent Office 3,301,365
Patented Jan. 31, 1967

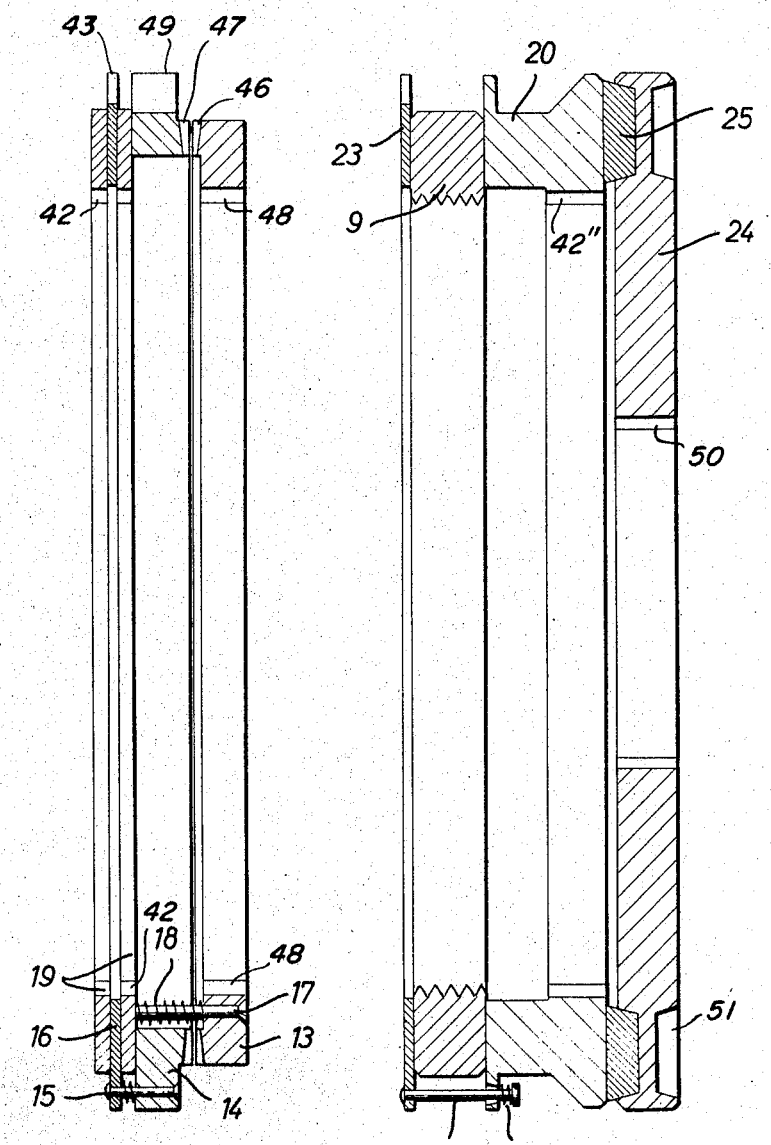

3,301,365
ELECTROMAGNETICALLY ACTUATING CLUTCHES
Wilhelm Binder, Rudolf Hauer, and Walter Oberecker, Villingen, Germany, assignors to Binder Magnete K.G., Villingen/Schwarzwald, Germany, a firm of Germany
Filed Feb. 27, 1963, Ser. No. 261,338
Claims priority, application Germany, Feb. 27, 1962, B 48,308
11 Claims. (Cl. 192—84)

Our invention relates to electromagnetically controlled mechanical clutches and more particularly to clutches in which a mechanical clutch assembly coaxially surrounds an electromagnetic structure and is actuated by an armature when the latter is magnetically attracted to the magnetic structure.

In a known clutch of this type the energizing winding for the magnet is sationary and surrounded by a magnetizable core cooperating with an armature of annular shape which has a radial extension acting upon a stack of clutch laminations peripherally seated on the core and joined therewith by interengaging teeth while bearing against an abutment ring.

The increasing use of electromagnetically operable clutches in various fields of industry has resulted in a variety of clutch construction, such as lamination-type clutches, claw- or gear-type clutches and single-disc friction clutches. This variety causes considerable difficulties to the manufacturer and distributor in requiring a large number of different parts to be kept in stock for meeting the greatly different demands.

It is an object of our invention to remedy this situation and to reduce the amount of stock to be kept by manufacturers, distributors or machine shops for the various types of clutches.

Another object of the invention is to afford conversion of an electromagnetically controlled clutch to any one of a variety of types, such as from the lamination type to the claw type, for example.

To achieve these objects and in accordance with our invention, we provide the clutch with a magnet member which has a ring-shaped energizing coil and a ring-shaped magnetizable core structure extending radially inward and outward of the coil in coaxial relation thereto for receiving the primary magnetic flux, the appertaining magnetizable armature being ring shaped and coaxially mounted beside the magnet member for movement axially toward the member when the coil is energized. The core structure of the magnet member is provided on its outer peripheral surface with axially extending teeth as well as with a screw thread with which an abutment ring is in threaded engagement so that the ring can be displaced in the axial direction along the teeth. In combination with such a magnet member and armature, we provide a plurality of mechanical clutch units of respectively different types which are selectively and exchangeably seatable coaxially on the peripheral surface of the core structure for engagement with the teeth thereof. The mechanical clutch unit seated on the core structure and in abutment with correspondingly adjusted abutment ring is then actuable by attraction of the armature. The mechanical clutch units, acording to another feature of our invention, comprise a lamination clutch, a gear- or claw-type clutch and a single-disc friction clutch so that any one of these types of clutches is selectively applicable with one and the same magnet member and armature.

By virtue of the invention one and the same basic clutch component, comprising the magnet member, is applicable for any desired type of clutch without the necessity of making any structural change. Furthermore, any clutch according to the invention can rapidly and readily be converted to a different type of clutch simply by exchanging the mechanical clutch assembly. This affords a considerable simplification in manufacture and a reduction in number of spare parts required and the amount of components to be kept in stock. It further offers the user the possibility of converting an available clutch to changes in working conditions without necessitating replacement of the entire clutch.

The foregoing and more specific features of our invention will be apparent from the embodiment of a multiple-use clutch according to the invention illustrated by way of example on the accompanying drawing in which:

FIG. 2 shows in section a gear-type mechanical clutch unit applicable instead of the lamination-type unit in a clutch otherwise corresponding to FIG. 1;

FIG. 3 is a sectional view of a single-disc friction clutch unit also applicable instead of the lamination unit in a clutch otherwise as shown in FIG. 1.

The illustrated electromagnetically controlled clutch is provided with a stationary energizing coil so that it does not require the provision of slip rings, although it will be understood that the invention is analogously applicable with rotatable energizing coils and slip rings.

Figure 1:
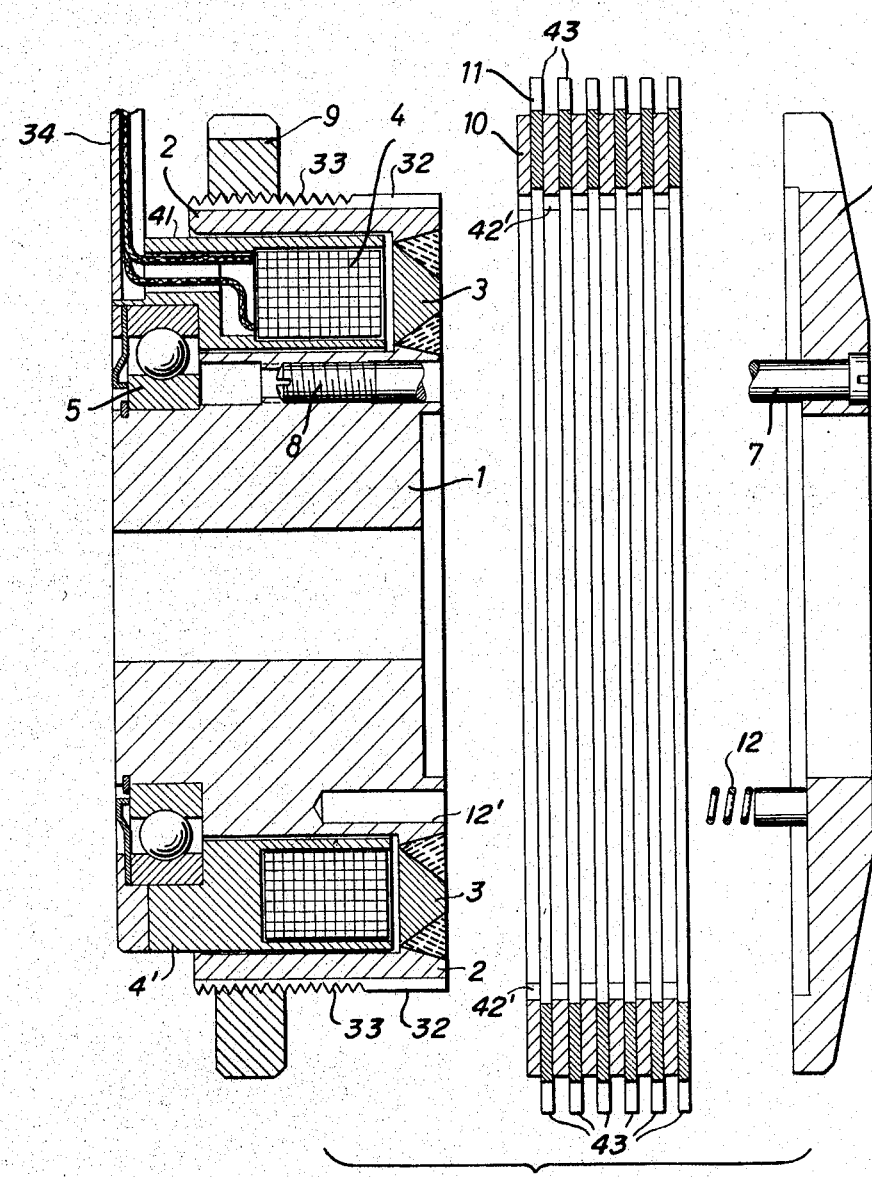
FIG. 1 shows in axial section an exploded view of a lamination clutch.

The fundamental component of the illustrated clutch according to FIG. 1 comprises an annular magnetizable core body 1 to be energized by the stationary winding 4. The core body 1 has an axial bore by means of which it can be fixed on one of the shafts to be clutched together. A ball bearing 5 serves to support the winding 4 on the core body 1. For this purpose the winding 4 is fixedly disposed in a housing 4' of magnetizable material. The body 1 carries at its right end a radial flange 3 of non-magnetizable material with which an outer cylindrical pole shoe 2 is fixedly supported on the core body 1 to form part of the entire core structure. Due to the insertion of the non-magnetic flange 3 there exists a magnetic field gap between the inner core 1 and the pole shoe 2 on the axial side of the core body facing the appertaining armature 6 which consists of a ring-shaped body and is secured to the magnet member by means of bolts 7 whose threaded ends are screwed into corresponding threaded bores of the core structure 1 and secured therein by means of short counter bolts 8. Three or more bolts 7 are uniformly distributed over the periphery, only one of them being visible in FIG. 1. Springs 12 seated against the armature 6 at one end and engaging a bore 12' of the core 1 at the other end tend to force the armature 6 away from the magnet member. Three or more such springs 12 are uniformly distributed over the periphery, only one of them being visible in FIG. 1. The armature 6 is axially slidable on the bolts 7 which are fastened to the core 1 in such a position that the heads of the bolts 7 determine the greatest spacing of the armature from the magnet member. When the coil 4 is energized, the armature is attracted toward the magnet member in opposition to the force of the spring 12.

In the outer peripheral surface of the pole shoe 2 there are formed axial grooves 32 and corresponding teeth which are uniformly distributed about the periphery. Also provided at the peripheral surface of the pole shoe 2 is a screw thread engaged by an inner thread of an abutment ring 9. The screw thread 33 is sufficiently long axially to permit adjusting the abutment ring 9 to the extent required to provide for the desired braking force under the action of the armature, regardless of the fact that the mechanical clutch assemblies now to be described may have various axial widths, depending upon the particular type of clutch assembly being seated on the magnet member.

Shown in FIGS. 1, 2 and 3 are three different types of mechanical clutch units that can be exchangeably and selectively mounted on the magnet member. The clutch unit according to FIG. 1 is of the lamination type. It comprises a stack of annular friction plates 10, 11 which are alternately provided with inner teeth 42' and outer teeth 43 respectively. When the clutch assembly is mounted on the magnet member, the internal teeth 42' of the laminations 10 engage the axial grooves 32 thus preventing the mechanical clutch assembly from rotating relative to the core structure. The second shaft or machine part to be clutched can then engage the outer teeth 43 of the lamination plates 11.

With the stack of laminations seated on the magnet member against the properly adjusted abutment ring 9, the attractive force imposed upon the armature 6 when the coil 4 is energized causes compression of the stack so that a corresponding increased friction is effective between the laminations for clutching the two shafts together.

The lamination unit according to FIG. 1 can be selectively exchanged by the mechanical clutch unit shown in FIG. 2 which is then magnetically controlled in the same manner as described above. The unit according to FIG. 2 is of the gear or claw type. It comprises two rings 13 and 14 which are each provided with an annular group of clutch teeth 46 and 47 axially protruding toward each other and engageable with each other. The ring 13 has inner teeth 48 which, when the clutch unit is seated on the core structure engage the grooves 32 thus non-rotatably securing the mechanical clutch unit to the magnet member. The clutch ring 14 has outer teeth 49 to be brought into engagement with the second shaft or machine part to be clutched together with the shaft that is joined with the core structure 1.

Figure 4:
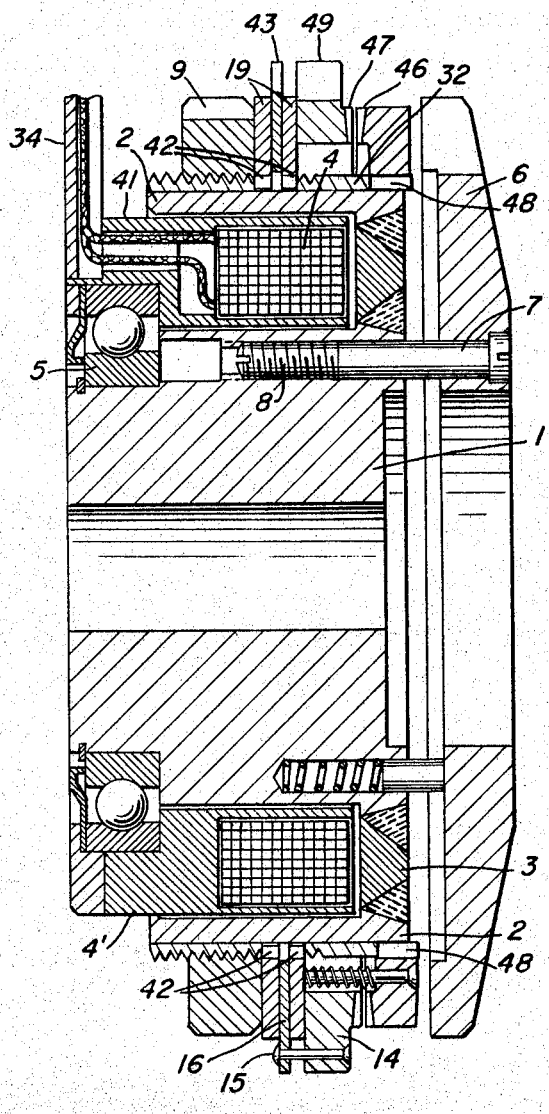
FIG. 4 shows in axial section an assembled view of the clutch of FIG. 1 with the lamination-type unit thereof replaced by the gear-type mechanical unit of FIG. 2.

The mechanical clutch unit according to FIG. 2 and FIG. 4 also comprises a set of laminations 16 and 19. Two laminations or friction-brake rings 19 are provided with inner teeth 42 for engaging the slots 32 of the magnet member, whereas the intermediate lamination 16 has outer teeth 43 serving the same purpose as the teeth 49 of the clutch ring 14. The lamination portion of the unit is also actuated by the armature 6 and serves to bring the claw-type clutch rings 13, 14 into synchronism prior to their clutching engagement. For this purpose, the clutch ring 13 is provided with a plurality of actuating pins 17 that act upon the lamination plates and on which the ring 13 can slide axially against the action of a spring 18 when the force exerted by the armature 6 becomes large enough to cause interengagement of the clutch teeth 46 and 47. In a similar manner the clutch ring 14 is resiliently connected to the plate 16.

Each of the mechanical clutch units shown in FIGS. 1 and 2 can be selectively replaced by the single-plate clutch shown in FIG. 3. In this unit, an armature ring 24 carries a friction lining 25 in a peripheral groove on one axial side. The armature plate 24 has an axial opening and internal teeth 50 for engagement with the second shaft. The friction lining 25 cooperates with a clutch ring 20 which has inner teeth 42' engageable with the slots 32 of the magnet member. When the clutch unit is assembled with the magnet, the ring 20 bears against the abutment ring 9 as shown in FIG. 3 and is held in position relative to the ring by means of an annular disc 23 and resilient connections each formed by a pin 21 and a spring 22, several such connections being distributed about the abutment ring 9.

In the construction shown in FIG. 1, the part 6 forms the armature, whereas in the construction shown in FIG. 3, the part 24 forms the armature. In FIG. 3, the disc 23 is additionally provided and serves to hold the ring member 20 by means of the securing pins 21 and springs 22 spaced along the periphery thereof so that the ring member 20 cannot slip to the right side after the excitation current has been switched off. The armature plate 24 may also have a peripheral recess 51 for receiving another friction lining (not shown) at the side remote from the clutch ring 20. The second friction lining is then available for cooperation with a stationary brake surface or with a clutch member of a second clutch after the illustrated clutch is disengaged. In this case the ring 24 will be selectively driven in one or the other direction, or it will be driven when moved axially in one direction but arrested when moved in the other axial direction.

The invention is not limited to the particular construction of the individual clutch and clutch components shown. The feature of providing for a plurality of different types of clutches with the aid of one and the same magnet member by having different mechanical clutch units selectively exchangeable, is also applicable in modified designs, as will be obvious to those skilled in the art upon a study of this disclosure. Hence our invention can be given embodiments other than particularly illustrated and described herein without departing from the essence of the invention and within the scope of the claims annexed hereto.

We claim:
1. An electromagnetically controlled mechanical clutch comprising a magnet member having a ring-shaped energizing coil and a ring-shaped structure magnetizable by said coil and extending radially inward and outward of said coil in coaxial relation thereto, a ring-shaped armature coaxially mounted beside said magnet member and magnetically movable axially toward said member when said coil is energized, and one of a plurality of mechanical clutch units being selectively and exchangeably seatable coaxially on said magnet member in non-rotational relation thereto, said magnet member having abutment means axially adjustable, a distance sufficient for adaptation to differences in axial width between said respective clutch units, said one of said units being disposed axially between said abutment means and said armature for clutching operation in response to axial magnetic pressure from said armature.

2. An electromagnetically controlled mechanical clutch comprising a magnet member having a ring-shaped energizing coil and a ring-shaped core structure, said core structure having two magnetizable portions extending radially inward and outward of said coil in coaxial relation thereto and forming a magnetic field gap at one axial side of said structure, said structure having an outer peripheral surface with longitudinally extending and peripherally distributed teeth and having a coaxial abutment ring in threaded engagement with said peripheral surface and thereby adjustable longitudinally of said teeth, a ring-shaped armature coaxially mounted beside said field gap and magnetically movable toward said core structure when said coil is energized, and one of a plurality of mechanical clutch assemblies being selectively and exchangeably seatable coaxially on said core structure and engaging said teeth to be prevented from rotation relative to said core structure, said one of said clutch assemblies being disposed axially between said abutment ring and said armature for operation by magnetic pressure from said armature.

3. An electromagnetically controlled mechanical clutch comprising a magnet member having a ring-shaped energizing coil and a ring-shaped structure magnetizable by said coil and extending radially inward and outward of said coil in coaxial relation thereto, a ring-shaped armature coaxially mounted beside said magnet member and magnetically movable axially toward said member when said coil is energized, one of a number of mechanical clutch units being exchangeably seatable coaxially upon said magnet member, said clutch units comprising a lamination clutch and a claw-type clutch and a single-disc friction clutch, each of said clutch units being non-rotatably engageable with said magnet member and, when seated upon said member, being located axially between said abutment means and said armature to be actuated by magnetic attraction of said armature.

4. An electromagnetically controlled mechanical clutch comprising a magnet member having a ring-shaped energizing coil and a ring-shaped core structure having a coaxial ring-shaped recess in which said coil is located, said structure and coil being rotatable one relative to the other, said core structure having two magnetizable portions extending radially inward and outward of said coil in coaxial relation thereto and forming a magnetic field gap at one axial side of said structure, said structure having an outer peripheral surface with longitudinally extending teeth and having a coaxial abutment ring in threaded engagement with said peripheral surface and thereby adjustable longitudinally of said teeth, a ring-shaped armature coaxially mounted beside said field gap and magnetically moveable toward said core structure when said coil is energized, one of a number of mechanical clutch units being exchangeably seatable coaxially upon said core structure, said clutch units comprising a lamination clutch and a claw-type clutch and a single-disc friction clutch, each of said clutch units being engageable with said teeth and, when seated on said structure, being located axially between said abutment ring and said armature to be actuated by magnetic attraction of said armature.

5. In an electromagnetically controlled clutch according to claim 2, said core structure comprising a ring of non-magnetizable material joining said two magnetizable core portions on the core side facing said armature.

6. In an electromagnetically controlled clutch according to claim 2, each of said clutch assemblies comprising longitudinal teeth on its inner peripheral surface for engagement with said teeth of said core structure, and said clutch assembly having longitudinal coupling teeth radially protruding from its outer peripheral surface.

7. In an electromagnetically controlled clutch according to claim 2, one of said clutch assemblies comprising two axially adjacent clutch rings, each having a concentric row of clutch teeth facing those of the other ring and clutchingly engageable therewith by relative axial displacement under control by said armature, one of said two clutch rings having further teeth distributed over its inner periphery for engagament with said teeth of said core structure, and said other clutch ring having external coupling teeth distributed over its outer periphery.

8. In an electromagnetically controlled clutch according to claim 7, said clutch assembly comprising synchonizing ring means coaxially inserted between said clutch rings and said abutment ring, said synchronizing means having at least one friction-brake ring in engagement with said teeth of said core structure and in friction-slip engagement with said clutch ring having said external teeth.

9. In an electromagnetically controlled clutch according to claim 2, one of said clutch assemblies comprising an annular friction disc coaxially seated on said core structure adjacent to said armature to form a friction clutch together therewith, said disc having inner teeth in engagement with said core-structure teeth.

10. In an electromagnetically controlled clutch according to claim 9, said armature having means for accommodating a friction lining on both axial armature sides.

11. In an electromagnetically controlled clutch according to claim 2, one of said clutch assemblies comprising a stack of ring-shaped coaxial laminations axially in frictional sliding engagement with one another, said laminations having alternately inner teeth and outer teeth respectively, the laminations with the inner teeth being engaged at said teeth with the core-structure teeth and thereby prevented from rotating relative to said core structure, the alternate laminations being externally engageable at said outer teeth.

References Cited by the Examiner

UNITED STATES PATENTS

| | | | |
|---|---|---|---|
| 1,601,903 | 10/1926 | Brassfield | 192—69 |
| 2,860,403 | 11/1958 | Meyer | 192—84 |
| 2,912,088 | 11/1959 | Breyer | 192—53.4 |
| 2,936,053 | 5/1960 | Reucker | 192—84 |

DAVID J. WILLIAMOWSKY, *Primary Examiner.*

F. R. HANDREN, A. T. McKEON,
*Assistant Examiners.*